United States Patent [19]

Otis

[11] Patent Number: 4,492,993
[45] Date of Patent: Jan. 8, 1985

[54] MAGNETIC RECORDING TAPE AND CORRESPONDING METHOD PROVIDING INDICATION OF END-OF-TAPE CONDITIONS

[75] Inventor: Douglas A. Otis, North Hollywood, Calif.

[73] Assignee: Rosstream Research Associates, Ltd., Cerritos, Calif.

[21] Appl. No.: 449,599

[22] Filed: Dec. 14, 1982

[51] Int. Cl.³ .............. G11B 15/06; G11B 15/22; G11B 23/30; G11B 23/42
[52] U.S. Cl. .................. 360/74.5; 242/188; 360/134; 369/52; 369/96
[58] Field of Search .......... 360/74.5, 74.6, 74.7, 360/134; 369/52, 93, 94, 95, 96; 242/188, 195

[56] References Cited

U.S. PATENT DOCUMENTS

| 1,822,727 | 9/1931 | Del Valle | 242/188 |
| 2,076,937 | 4/1937 | Cannon | 369/93 |
| 3,702,908 | 11/1972 | Sugiura | 360/134 |
| 3,942,190 | 3/1976 | Detwiler | 360/63 |
| 4,058,841 | 11/1977 | Kishi et al. | 360/27 |

FOREIGN PATENT DOCUMENTS 435326 10/1926 Fed. Rep. of Germany ........ 369/96

Primary Examiner—George G. Stellar
Attorney, Agent, or Firm—Fulwider, Patton, Rieber, Lee & Utecht

[57] ABSTRACT

A multi-track magnetic recording tape and a corresponding method for providing an early warning of end-of-tape conditions and an indication of load-point conditions, without the use of inter-track markers. The recording tracks are divided into two sets located on separate halves of the tape, and the sets of tracks are longitudinally offset with respect to each other, to provide a half-width unrecordable region at each end of the tape. A tape marker is located in each of the unrecordable regions, each marker serving as a load-point marker for use with one set of tracks, and as an early-warning marker for use with the other set of tracks.

8 Claims, 2 Drawing Figures

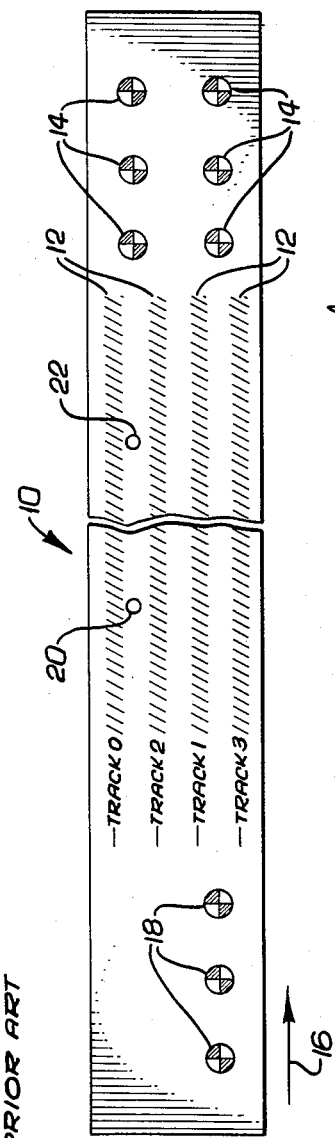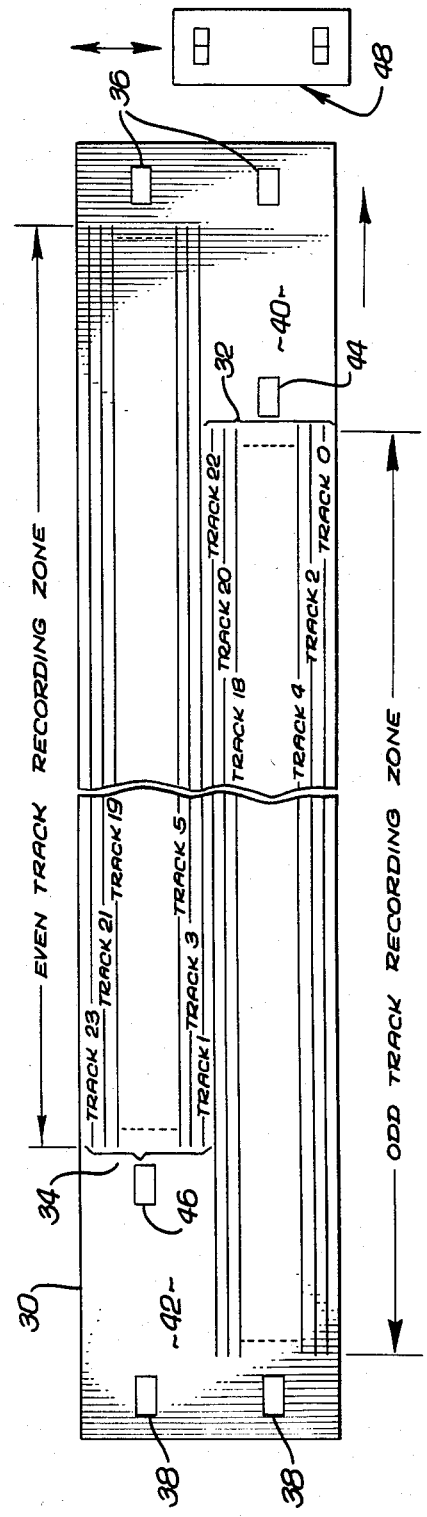

MAGNETIC RECORDING TAPE AND CORRESPONDING METHOD PROVIDING INDICATION OF END-OF-TAPE CONDITIONS

BACKGROUND OF THE INVENTION

The present invention relates generally to the field of magnetic tape drives for recording of data, and more particularly, to techniques for detecting end-of-tape and beginning-of-tape conditions. In some types of tape drives, data are recorded in multiple parallel tracks along the tape, to increase the recording density. For data recording, two tape markers are required at each end of the tape.

An end-of-tape marker is positioned close to the physical end of the tape, to signal the end of the usable area of the tape and to prevent removal of the tape from its spool. In addition, a warning marker is needed some distance before the end-to-tape marker. When the warning marker is encountered, recording can be appropriately terminated by writing a block of information, referred to as a postamble, before reaching the end of the usable area of the tape. The same two types of markers are also provided near the other end of the tape, since half of the tracks in multiple-track tapes are recorded in one direction and the other half of the tracks are recorded in the other direction. The warning markers actually serve a dual purpose in some tape controllers. Before starting to record on track, the controller must first detect the marker used as a warning marker when recording in the opposite direction. When encountered at the beginning of a recording track, the marker identifies a tape load point and recording is not initiated until the load point is reached.

The end-of-tape and beginning-of-tape markers are typically formed as holes through the tape material. The hole positions can then be sensed optically or by electrical means. In tape drives of the prior art, there are typically no more than four parallel recording tracks on a tape one-quarter-inch wide. The warning or load-point markers are formed as small holes positioned between two adjacent recording tracks. Although this arrangement has been generally satisfactory, it significantly limits the number of parallel tracks that can be accommodated on the tape. The present invention was conceived to allow warning markers to be incorporated onto a tape having up to twenty-four tracks and having a width of only one-quarter of an inch.

SUMMARY OF THE INVENTION

The present invention resides in a recording tape and a corresponding method for detecting early-warning markers and load-point markers on a muti-track magnetic recording tape. Basically, the method includes the steps of positioning a first set of the recording tracks on a first half of the tape, for reading and writing in a first tape direction, and positioning a second set, constituting the remainder of the recording tracks, on the second half of the tape, for reading and writing in the opposite tape direction, the second set of tracks being offset longitudinally with respect to the first set, leaving a first unrecordable half-width region prior to the beginning of the first set of tracks and a second unrecordable half-width region prior to the beginning of the second set of tracks.

The method further includes the steps of providing a first tape marker and providing a second tape marker. The first tape marker is located in the first unrecordable region in such a position as to be encountered when the beginning of one of the first set of tracks is positioned in engagement with a read/write head, and also serving as a warning marker when one of the second set of tracks is being used. The second tape marker is located in the second unrecordable region in such a position as to be encountered when the beginning of one of the second set of tracks is positioned in engagement with the read/write head, and also serving as a warning marker when one of the first set of tracks is being used.

The method may also include providing end-of-tape markers close to the physical ends of the tape, to allow the detection of the approaching physical ends of the tape in a conventional fashion. The form of the first and second markers used for warning and load-point indications is not critical to the invention. What is important is that the markers do not have to be positioned between tracks.

In terms of a novel tape structure, the invention includes a multi-track recording tape having a first set of recordable tracks on a first half of the tape and a second set of recordable tracks on the the second half of the tape, the two sets of tracks being offset longitudinally to leave a first unrecordable half-width region at the beginning of the first set of tracks and a second unrecordable half-width region at the beginning of the second set of tracks. The tape further includes first and second tape markers. The first tape marker is located in the first unrecordable region in such a position as to be encountered when the beginning of one of the first set of tracks is positioned in engagement with a read/write head, and also serves as a warning marker when one of the second set of tracks is being used. The second tape marker is located in the second unrecordable region in such a position as to be encountered when the beginning of one of the second set of tracks is positioned in engagement with the read/write head, and also serves as a warning marker when one of the first set of tracks is being used. The tape further includes conventional end-of-tape markers located near the physical ends of the tape.

It will be appreciated from the foregoing that the present invention represents a significant advance over prior art techniques. In particular, the invention allows the use of high-density multi-track tapes. Such tapes can be provided with early-warning and load-point markers without using between-track holes or other markers, which would limit the number of recording tracks. Other aspects and advantages of the invention will become apparent from the following more detailed description, taken in conjunction with the accompanying drawings.

BRIEF DESCRIPTION OF THE DRAWINGS

FIG. 1 is a diagrammatic plan view of a magnetic tape with tracks and markers located in accordance with a prior-art technique; and FIG. 2 is a diagrammatic plan view of a magnetic tape with tracks and markers located in accordance with the present invention.

DESCRIPTION OF THE PREFERRED EMBODIMENT

As shown in the drawings for purposes of illustration, the present invention is principally concerned with a technique for detecting the beginning and end of a magnetic recording tape used to store data. More importantly, the invention relates to a method and means for detecting a warning condition prior to an end-of-tape condition.

In the past, multi-track tapes have been configured in the manner illustrated in FIG. 1. The tape, indicated generally by reference numeral 10, has four recording tracks 12, designated tracks #0, #1, #2, and #3, extending in parallel along most of the length of the tape. The tape has two rows of beginning-of-tape markers in the form of holes 14 shown at the right-hand end portion of the tape. The tape is moved either in a forward direction, to the right, as indicated by the arrow 16, or in the reverse direction. The even-numbered tracks are read from or written to in the forward direction, and the odd-numbered tracks are read from or written to in the reverse direction. A sensor (not shown) detects the presence of the holes 14 when the tape is positioned with the right-hand end of one of the even-numbered tracks 12, such as track #0, located in engagement with a read/write magnetic recording head (also not shown). At the other end of the tape 10 is a row of end-of-tape markers in the form of holes 18. These are arranged in a single row so that they may be easily distinguished from the two rows of markers 14 at the beginning of the tape.

In the recording of data on tapes of this general type, it is important to be able to detect the end (or beginning) of the tape some time in advance of using up all of the recordable portion of a recording track currently in use. By means of this early warning of the approaching end of tape, recording can be appropriately terminated without risk of losing data when the recordable track suddenly ends. Termination of recording usually involves writing a special block of information, sometimes referred to as a postamble. For the even-numbered tracks #0 and #2, the warning of the end-of-tape condition is provided by a marker 20 in the form of a hole located between two adjacent tracks. The hole 20 can be sensed by the same means as the beginning-of-tape and end-of-tape markers 14 and 18, and provides an early warning of the approaching end of the tape.

For the odd-numbered tracks #1 and #3, a second warning marker 22, located in the same inter-track space as the marker 20, provides a similar indication of an approaching end-of-tape condition. The markers 20 and 22 serve another purpose as well. When the tape 10 is being driven in the forward direction, the marker 22 serves to mark a tape load point that must be detected before writing to or reading from an even-numbered track. Similarly, the marker 22 serves as a load-point marker for the odd-numbered tracks. Unfortunately, this technique cannot be used when the number of tracks is increased significantly above four. When a larger number of tracks, such as twenty-four, are used on a standard quarter-inch wide tape, there is insufficient space between tracks for the warning markers 20 and 22.

In accordance with the present invention, warning markers are provided for approaching end-of-tape and load-point conditions, but without using inter-track holes or other inter-track markers. The novel technique for achieving this result is illustrated in FIG. 2.

In the illustrative embodiment, a quarter-inch tape 30 is divided into twenty-four tracks, designated by track #0 through track #23. It will be seen that the even-numbered tracks, #0, #2, and so forth, are indicated by reference numeral 32 and are located on the lower half of the tape 30. The odd-numbered tracks, #1, #3, and so forth, are indicated by reference numeral 34 and are located on the upper half of the tape 30. Close to the right-hand end of the tape 30, as shown in FIG. 2, are a pair of beginning-of-tape markers 36, employed to sense the beginning of the tape. Similarly, at the other end of the tape 30 are a pair of end-of-tape markers 38. If desired, only one end-of-tape marker could be used, to differentiate the two ends of the tape, but this is not pertinent to the invention.

It is important to note that the even-numbered tracks 32 do not begin immediately adjacent to the beginning-of-tape markers 36, but that there is an unrecordable region 40 between the lower row of the beginning-of-tape markers and the start of the even-numbered recording tracks 32. This region 40 is only half the width of the tape 30, since the odd-numbered tracks 34 extend practically all the way to the upper row of the beginning-of-tape markers 36. Similarly, at the other end of the tape 30 there is another half-width unrecordable region 42 between the upper one of the end-of-tape markers 38 and the beginning of the odd-numbered tracks 34. Thus, the even-numbered tracks 32 and the odd-numbered tracks 34 are longitudinally offset to provide the two unrecordable regions 40 and 42.

In accordance with the invention, a tape marker 44 is located in the unrecordable region 40, immediately adjacent to the leading ends of the even-numbered tracks 32, and another tape marker 46 is located in the other unrecordable region 42, immediately adjacent to the leading ends of the odd-numbered tracks 34. A ganged pair of read/write recording heads, indicated diagrammatically at 48, is movable transversely with respect to the tape, to effect reading from or writing to selected pairs of tracks. In the position shown, the two heads are positioned over tracks #0 and #1. When the tape is moved in a forward direction, indicated by the arrow 50, track #0 is in operative engagement with the lower of the recording heads 48, which is activated appropriately for reading or writing of data. When the tape 30 is ultimately reversed, the upper of the recording heads 48 is activated, and track #1 is available for reading or writing data.

When reading from or writing to one of the even-numbered tracks 32, the marker 44 preceeding the even-numbered tracks is employed as a load-point marker. The tape 30 is first advanced from the beginning-of-tape position until the load point is reached, as determined by the sensing of the marker 44; then reading or writing of data is initiated on one of the even-numbered tracks 32.

As the end of the even-numbered track approaches, an early warning of the end-of-tape condition is provided by the other tape marker 46, located in the upper half of the tape. When this warning condition has been sensed, an appropriate termination block of information can be written to the even-numbered track, assuming recording is in progress, and all recording can be completed before the end-of-tape markers 38 are sensed. For recording in the reverse direction, the marker 46 serves as a load-point marker for the odd-numbered tracks 34 and the marker serves as an early warning of the approaching beginning-of-tape condition.

It will be appreciated from the foregoing that the invention achieves the desired result of providing an early warning of end-of-tape conditions and a load-point marker at the start of reading or writing on a track, but does so without the use of inter-track markers, which would be totally impractical for high-density multi-track tapes. Since the early-warning and load-point markers are located in unrecordable regions of the tape, they are not seriously limited in physical size, and may, for example, take the form of holes through the tape.

It will also be appreciated that, although a specific embodiment of the invention has been described in detail by way of illustration, various modifications may be made without departing from the spirit and scope of the invention. Accordingly, the invention is not to be limited except as by the appended claims.

I claim:

1. A method of detecting a warning marker indicative of an approaching end-of-tape condition for one direction of tape motion, and indicative of a load point in the other direction of tape motion, said method comprising the steps of:

positioning a first set of the recording tracks on a first half of the tape, for reading and writing in a first tape direction;

positioning a second set, constituting the remainder of the recording tracks, on the second half of the tape, for reading and writing in the opposite tape direction, the second set of tracks being offset longitudinally with respect to the first set, leaving a first unrecordable half-width region prior to the beginning of the first set of tracks and a second unrecordable half-width region prior to the beginning of the second set of tracks;

providing a first tape marker located in the first unrecordable region in such a position as to be encountered when the beginning of one of the first set of tracks is positioned in engagement with a read/write head, and also serving as a warning marker when one of the second set of tracks is being used; and providing a second tape marker located in the second unrecordable region in such a position as to be encountered when the beginning of one of the second set of tracks is positioned in engagement with the read/write head, and also serving as a warning marker when one of the first set of tracks is being used.

2. A method as set forth in claim 1, and further including the step of:

providing end-of-tape markers close to the physical ends of the tape.

3. A multi-track magnetic recording tape capable of providing an early warning of an approaching end-of-tape condition without the use of inter-track markers, said tape comprising:

a first set of the recordable tracks located on a first half of said tape, for reading and writing in a first tape direction;

a second set of recordable tracks located on the second half of the tape, for reading and writing in the opposite tape direction, said second set of tracks being offset longitudinally with respect to said first set, leaving a first unrecordable half-width region prior to the beginning of said first set of tracks and a second unrecordable half-width region prior to the beginning of said second set of tracks;

a first tape marker located in said first unrecordable region in such a position as to be encountered when the beginning of one of said first set of tracks is positioned in engagement with a read/write head, and also serving as a warning marker when one of said second set of tracks is being used; and a second tape marker located in said second unrecordable region in such a position as to be encountered when the beginning of one of said second set of tracks is positioned in engagement with the read/write head, and also serving as a warning marker when one of said first set of tracks is being used.

4. A tape as set forth in claim 3, wherein there are at least twelve recordable tracks in each of said first and second sets of tracks.

5. A tape as set forth in claim 3, wherein said first and second tape markers are in the form of holes through said tape.

6. A tape as set forth in claim 3, and further including:

a beginning-of-tape marker located near the physical beginning of said tape and following the end of the second set of tracks; and an end-of-tape marker located near the physical end of said tape and following the end of the first set of tracks.

7. A tape as set forth in claim 6, wherein there are at least twelve recordable tracks in said first and second sets of tracks.

8. A tape as set forth in claim 6, wherein said first and second tape markers are in the form of holes through said tape.

* * * * *